United States Patent
Weaver et al.

(10) Patent No.: US 11,866,361 B2
(45) Date of Patent: Jan. 9, 2024

(54) FUEL GAS AND OXYGEN BURNER

(71) Applicant: Honeywell International Inc., Morris Plains, NJ (US)

(72) Inventors: Joshua J. Weaver, Yorktown, IN (US); Curtis L. Taylor, Paradise Valley, AZ (US); Marek Scholler, Unicov (CZ); Bradley M. Wright, Hartford City, IN (US)

(73) Assignee: Honeywell International Inc., Charlotte, NC (US)

( * ) Notice: Subject to any disclaimer, the term of this patent is extended or adjusted under 35 U.S.C. 154(b) by 628 days.

(21) Appl. No.: 16/667,692

(22) Filed: Oct. 29, 2019

(65) Prior Publication Data
US 2021/0122660 A1  Apr. 29, 2021

(51) Int. Cl.
*C03B 7/06* (2006.01)
*C03B 5/235* (2006.01)
*F23D 14/22* (2006.01)
*F23D 14/32* (2006.01)

(52) U.S. Cl.
CPC ............ *C03B 7/065* (2013.01); *C03B 5/2353* (2013.01); *F23D 14/22* (2013.01); *F23D 14/32* (2013.01)

(58) Field of Classification Search
CPC ........................................ C03B 7/065
See application file for complete search history.

(56) References Cited

U.S. PATENT DOCUMENTS

| | | | | | |
|---|---|---|---|---|---|
| 4,067,681 | A | * | 1/1978 | Reid, Jr. | F24C 3/10 126/39 J |
| 4,367,042 | A | * | 1/1983 | Smith, Jr. | G01N 21/72 356/417 |
| 4,416,620 | A | * | 11/1983 | Morck | F23D 14/125 431/348 |
| 5,411,394 | A | * | 5/1995 | Beer | F23C 7/006 431/9 |

(Continued)

FOREIGN PATENT DOCUMENTS

| | | | | |
|---|---|---|---|---|
| CN | 1261138 A | | 7/2000 | |
| EP | 1112972 A1 | * | 7/2001 | ............. C03B 5/167 |

OTHER PUBLICATIONS

John McMinn, "Forehearths of the Future", Glass Forming, Emhart Glass.

(Continued)

*Primary Examiner* — Vivek K Shirsat
(74) *Attorney, Agent, or Firm* — Ortiz & Lopez, PLLC; Kermit D. Lopez; Luis M. Ortiz

(57) ABSTRACT

A coaxial fuel and oxygen pipe apparatus can include a fuel pipe and an oxygen pipe, wherein the fuel pipe is contained within the oxygen pipe and the oxygen pipe comprises an internal diameter that is continuous without diameter changes along a length of the oxygen pipe. The fuel pipe can include an internal diameter that is continuous without diameter variations along a length of the fuel pipe. A discharge block includes a diverging section and a discharge that forms a final outlet with respect to the fuel pipe and the oxygen pipe. The discharge block is configured with two angles that can facilitate conditions for eliminating recirculation, wherein the two angles are matched to an expansion rate of the products of combustion to maintain a positive pressure throughout a final discharge from the final outlet.

14 Claims, 5 Drawing Sheets

(56) References Cited

U.S. PATENT DOCUMENTS

| | | | |
|---|---|---|---|
| 5,500,300 A | 3/1996 | Joshi et al. | |
| 5,743,723 A | 4/1998 | Iatrides et al. | |
| 5,814,121 A | 9/1998 | Travis | |
| 6,123,542 A | 9/2000 | Joshi et al. | |
| 6,190,158 B1 | 2/2001 | Legiret et al. | |
| 6,193,173 B1 * | 2/2001 | Bodelin | F23D 14/22 |
| | | | 239/DIG. 19 |
| 6,233,974 B1 * | 5/2001 | Anderson | F23D 14/32 |
| | | | 65/346 |
| 6,332,340 B1 | 12/2001 | Bodelin et al. | |
| 2011/0000261 A1 | 1/2011 | Prabhakar et al. | |
| 2013/0071796 A1 | 3/2013 | Cole et al. | |
| 2016/0025334 A1 * | 1/2016 | Taylor | F23L 5/02 |
| | | | 431/350 |
| 2016/0245505 A1 * | 8/2016 | Taylor | F23M 5/025 |

OTHER PUBLICATIONS

Search Report for corresponding European Application No. 20199489.4.
Office Action for corresponding CN Application No. 202011093611.7.
Reporting letter dated Jul. 1, 2022 for Chinese Patent Application for Invention No. 202011093611.7, including the Office Action and translation; cited reference; and the Search Report and translation.

* cited by examiner

FUEL GAS AND OXYGEN BURNER

TECHNICAL FIELD

Embodiments are generally related to glass furnace melters. Embodiments further relate to oxygen fuel gas burners for glass furnace forehearths.

BACKGROUND

In the production of glass, melting raw materials in a glass-melting furnace can first form molten glass. This molten glass can pass through a forehearth to achieve temperature uniformity and required properties, for example, viscosity, before reaching the molding section (or forming machines) where the glass can be given the desired shape. The forehearth usually includes a long refractory-lined channel. In the forehearth, multiple burners may be installed and utilized to supply heat along the length of the channel to maintain the glass at a very specific temperature profile. A typical forehearth may contain tens or even hundreds of burners. Due to the large number of burners, it is extremely beneficial to have burners that require very low maintenance.

Due to the high temperature of molten glass in the forehearth, volatilization of substances present in the flow channel such as glass, boron, sulfur etc. can occur in significant quantities. These volatilized substances can re-condense on any cooler surfaces present within the forehearth. The outer surface of the burner can be one such relatively low temperature surface due to the cooling action of the fuel and oxidant that continuously flows inside the burner.

Oxygen fuel combustion for glass furnace melters has been widely adopted in the last 30 years. Oxygen combustion offers the greatest amount of NOx reductions over other techniques. This and many other advantages of oxygen fuel combustion have led to its wide adoption by industry. Oxygen fuel combustion in the forehearth is a natural expansion of the technology.

The forehearth environment differs from the melter in a few key areas that affect the design of burners. First, a function of the forehearth is to maintain the molten glass temperature while it travels to the next operation, therefore the volumetric flow rates through each burner are much less compared to a melter burner. This creates a much calmer atmosphere in the forehearth. Second, the burners are located quite close to the free surface of the molten glass. These two differences, low flow rates, and close proximity to the molten glass can create an environment that leaves the forehearth burners and blocks particularly vulnerable to glass vapor recondensation.

A significant amount of glass vapor is present in a glass furnace atmosphere, with the concentration increasingly moving closer to the molten glass. If this furnace atmosphere filled with glass vapor is allowed to come in contact with a surface cool enough, it can condense and gradually buildup on that surface. Due to the low volume of the products of combustion in a forehearth burner, the design of the discharge block and nozzle becomes critical to avoiding this issue.

Conventional designs of oxygen fuel forehearth burner blocks have wide discharge throats on the hot face in order to keep the block away from the high temperature flame. Conventional designs also have high fuel gas velocities. These two characteristics can contribute to furnace gas re-circulation into the burner block. By opening the throat of the discharge too wide too quickly, voids may be created in which there are no products of combustion, and this can draw in furnace atmosphere. A fuel velocity that is too high can aspirate furnace atmosphere.

FIG. 1 illustrates CFD (Computational Fluid Dynamics) results 10 demonstrating the re-circulation patterns caused by both of the characteristics discussed above, in accordance with a prior art oxygen fuel forehearth apparatus. Note that the acronym CFD and term "Computational Fluid Dynamics" relate to fluid mechanics and the use of numerical analysis and data structures to analyze and solve problems that involve fluid flows. CFD can involve the simulation of the free-stream flow of fluid and the interaction of the fluid (e.g., liquids and gasses) with surfaces defined by boundary conditions.

The CFD results 10 shown in FIG. 1 indicate that as the furnace atmosphere is drawn in, the glass vapor present condensates on the cooler portions of the block and burner, which are further from the hot forehearth. These glass deposits can cause rapid mixing beyond the normal design, which in an oxygen fuel burner, can result in higher than expected temperatures in the block and burner tip.

FIG. 2 illustrates an image 20 of a hot burner tip caused by glass buildup, in accordance with a prior art oxygen fuel forehearth apparatus. FIG. 3 illustrates an image 30 of glass buildup on a burner tip, in accordance with a prior art oxygen fuel forehearth apparatus. FIG. 4 illustrates an image 40 of glass buildup on a burner block, in accordance with a prior art oxygen fuel forehearth apparatus. FIGS. 1-4 thus demonstrate various conditions of glass buildup and subsequent overheating.

These higher temperatures can melt burner tips, and reduce the functional life of the discharge block if left unattended. This problem can result in excessive maintenance to keep burners clear of buildup. The nature of the forehearth means that maintenance personnel will need to clean hundreds of burners to avoid premature burner failure. By eliminating the buildup, maintenance time will be reduced drastically and the effective life of the burner improved. To date, devices and techniques have not been implemented, which specifically address this issue of glass buildup.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved components for a glass furnace melter.

It is another aspect of the disclosed embodiments to provide an improved glass furnace forehearth.

It is another aspect of the disclosed embodiments to provide for a coaxial fuel and oxygen pipe apparatus for use with a glass furnace forehearth.

The aforementioned aspects and other objectives can now be achieved as described herein.

In an embodiment, a coaxial fuel and oxygen pipe apparatus, can include a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe, and a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet.

In an embodiment, the coaxial fuel and oxygen pipe apparatus can further include a burner that can be inserted into the discharge block.

In an embodiment of the coaxial fuel and oxygen pipe apparatus, oxygen can enter the oxygen pipe through a burner at a right angle to a longitudinal axis of the burner and fuel enters the fuel pipe axially through the burner.

In an embodiment, the coaxial fuel and oxygen pipe apparatus can further include a burner that is inserted into the discharge block, wherein oxygen enters the oxygen pipe through the burner at a right angle to a longitudinal axis of the burner and fuel enters the fuel pipe axially through the burner, wherein the fuel pipe extends beyond the oxygen pipe.

In an embodiment of the coaxial fuel and oxygen pipe apparatus, the fuel pipe can be setback from the diverging section of the discharge block.

In an embodiment of the coaxial fuel and oxygen pipe apparatus, the discharge block can be operable to accept the fuel pipe.

In an embodiment of the coaxial fuel and oxygen pipe apparatus, the throat can match an internal diameter of the oxygen pipe.

In an embodiment of the coaxial fuel and oxygen pipe apparatus the discharge block can be configured to accept the fuel pipe, and the throat matches an internal diameter of the oxygen pipe.

In another embodiment, a coaxial fuel and oxygen pipe apparatus, can include a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe; a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet; and a burner that is inserted into the discharge block.

In still another embodiment, a forehearth can include a coaxial fuel and oxygen pipe apparatus that includes a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe; a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet;  and a burner that is inserted into the discharge block, wherein oxygen enters the oxygen pipe through the burner at a right angle to a longitudinal axis of the burner and fuel enters the fuel pipe axially through the burner, wherein the fuel pipe extends beyond the oxygen pipe.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
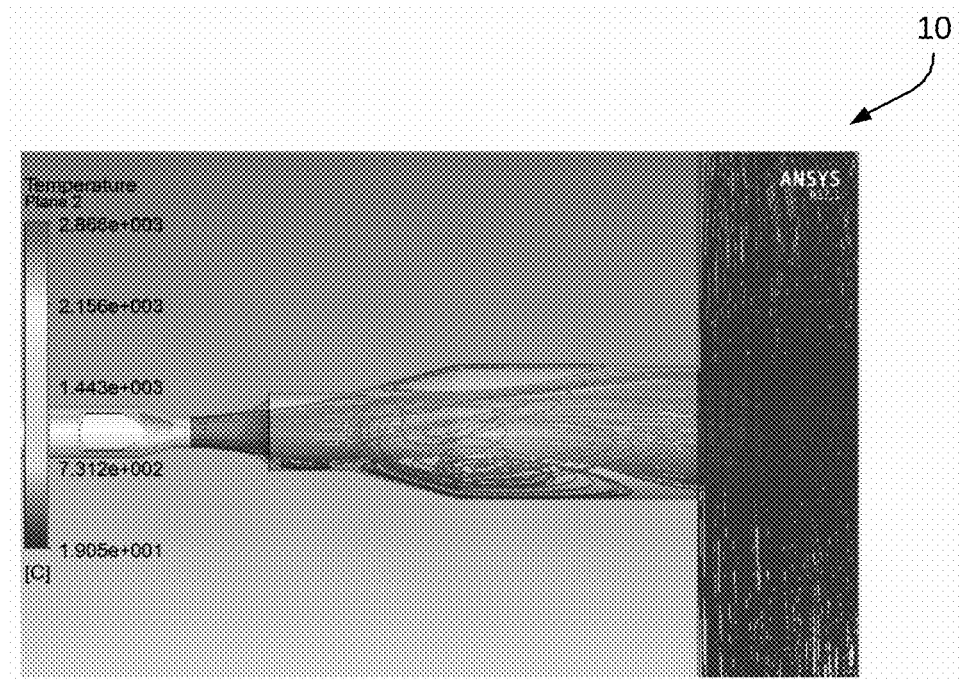
FIG. 1 illustrates CFD results demonstrating the re-circulation patterns caused by both of the characteristics discussed above, in accordance with a prior art oxygen fuel forehearth apparatus.
Figure 2:
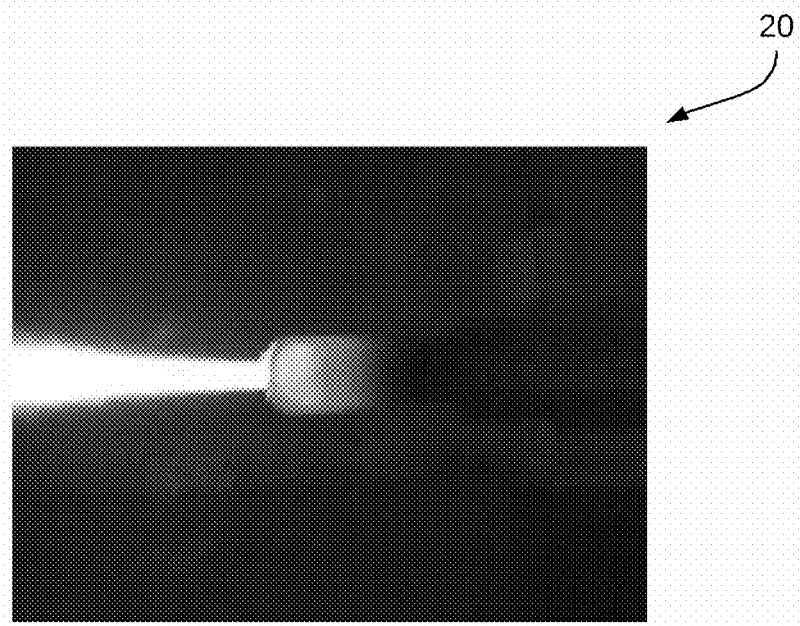
FIG. 2 illustrates an image of a hot burner tip caused by glass buildup, in accordance with a prior art oxygen fuel forehearth apparatus.
Figure 3:
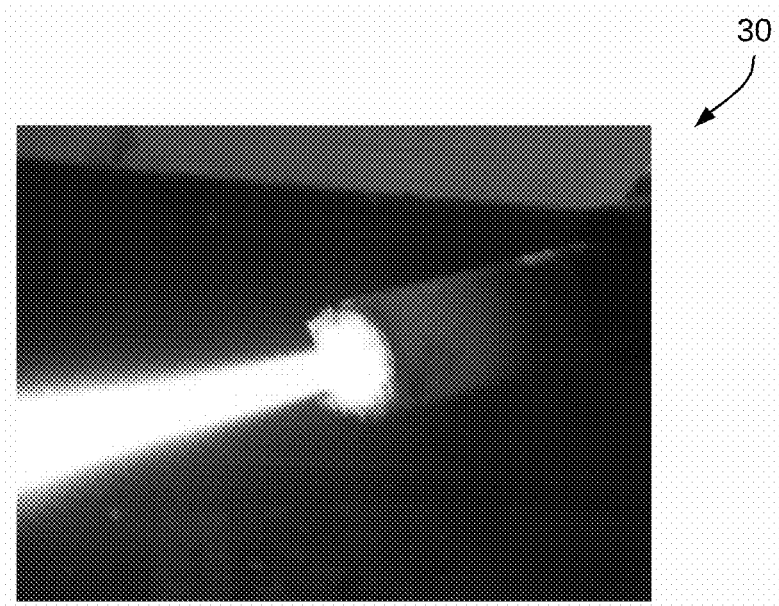
FIG. 3 illustrates an image of glass buildup on a burner tip, in accordance with a prior art oxygen fuel forehearth apparatus.
Figure 4:
FIG. 4 illustrates an image of glass buildup on a burner block, in accordance with a prior art oxygen fuel forehearth apparatus.
Figure 5:
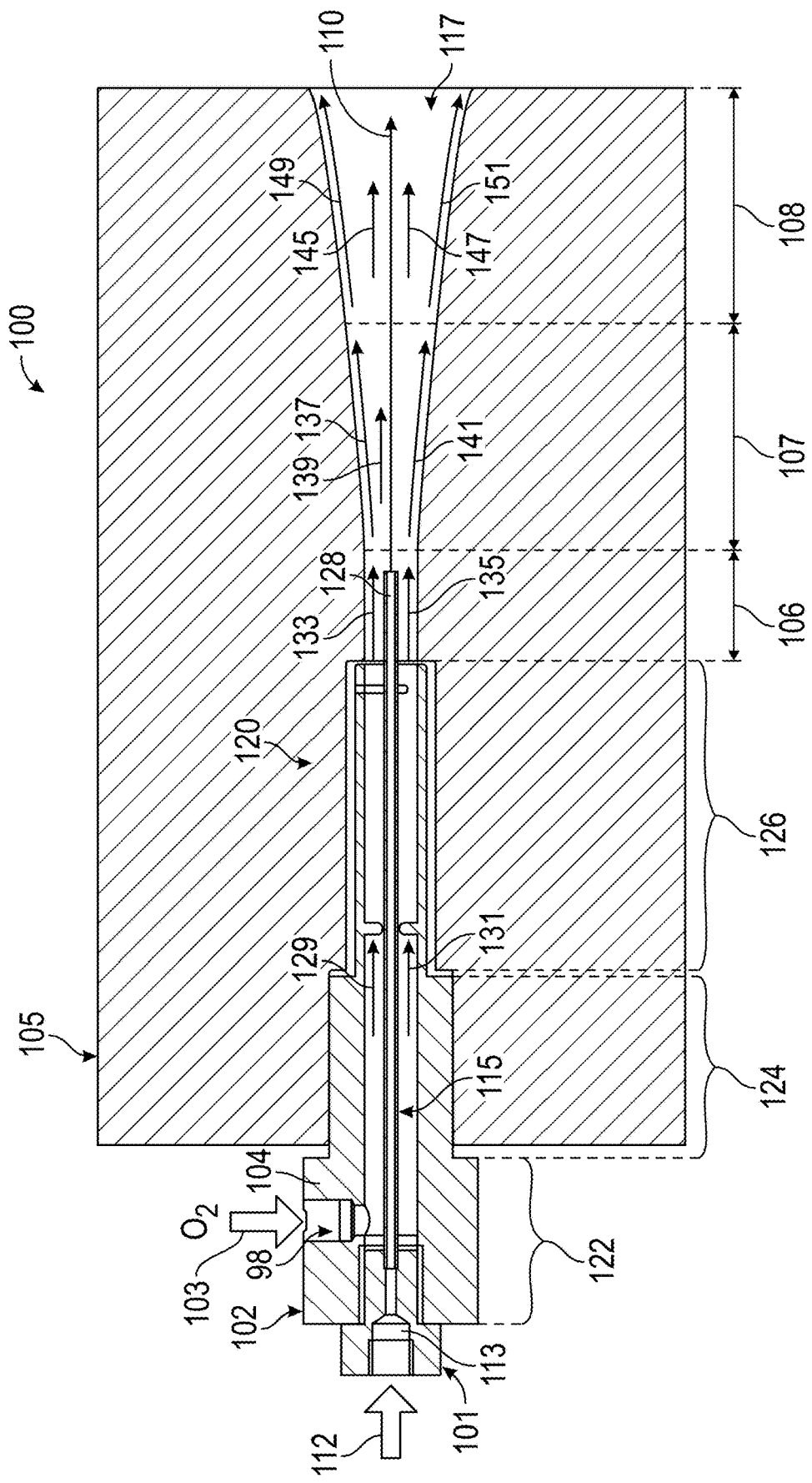
FIG. 5 illustrates a coaxial fuel and oxygen pipe apparatus, in accordance with an embodiment.

FIG. 5 illustrates a coaxial fuel and oxygen pipe apparatus 100, in accordance with an embodiment. As depicted in FIG. 5, the coaxial fuel and oxygen pipe apparatus 100 can include a discharge block 105 and a central body 120 contained within the discharge block 105. The central body can include four sections including a first section 122, a second section 124, a third section 126, and a protruding section 128. The central body 120 of the coaxial fuel and oxygen pipe apparatus 100 can contain a fuel pipe 101 and an oxygen pipe 102. The discharge block 104 can include a gap or area constituting a discharge throat 117. The fuel pipe 101 can be contained within the oxygen pipe 102. The internal diameter of the oxygen pipe 102 is continuous with no diameter changes along its length. The internal diameter of the fuel pipe 101 is also continuous with no diameter changes.

Oxygen enters the oxygen pipe 102 in a hole or gap 98 through a burner 104 at a right angle to its longitudinal axis as indicated at arrow 103. The fuel enters the fuel pipe 101 axially through the burner 104 as indicated by arrow 112. The fuel pipe 101 extends beyond the oxygen pipe 102 by less than, for example, an inch. The fuel pipe 101 includes a first fuel portion 113 and a second fuel pipe portion 115. The second fuel pipe portion 115 can be thinner and narrower than the first fuel pipe portion 113. The burner 104 can be inserted into the discharge block 105. Note that the term "burner" as utilized herein can also refer to a forehearth burner and can relate to a burner body or a burner block. The terms "burner body" and "burner block" can be utilized interchangeably to refer to the same component or feature of a burner.

Upon assembly, the fuel pipe 101 can be setback from the diverging section of the discharge block 105 by, for example ³⁄₁₆". The discharge block 105 can be configure to accept the fuel pipe 101 and match the internal diameter of the oxygen pipe 102 for approximately 1 inch, as indicated by arrow 106, before diverging at, for example, 8° for 2 inches as indicated by arrow 107, and can further diverge 16°, for example, until the final outlet as indicated by arrow 108. A flame utilized with the coaxial fuel and oxygen pipe apparatus 100 may possess a low velocity layer of oxygen surrounding the flame, as indicated by arrows 139, 131, 133, 135, 137, 139, 141, 145, 147, 149, and 141 until the flame exits or discharged from the discharge block 105. The fuel can be introduced at the center of the flame at a low velocity as indicated by arrow 110.

The coaxial fuel and oxygen pipe apparatus 100 addresses a major maintenance issue that is present in current oxygen forehearth burners. Conventional technologies relating to oxygen fuel forehearth burners relate principally to the burner design. The coaxial fuel and oxygen pipe apparatus 100, on the other hand, combines the forehearth burner nozzle and burner discharge block design into a cohesive solution to glass buildup.

The specific combination of a low velocity burner nozzle with a burner block creates a cooler operation and eliminates forehearth atmosphere re-circulation, which in turn means no glass buildup on internal features. Conventional oxygen fuel forehearth burners include a converging section in the oxygen path, which can cause rapid mixing of the oxygen and fuel. This rapid mixing can increase the area of the flame within flammability limits and exposes the metallic and ceramic portions of the design to high flame temperatures. The coaxial fuel and oxygen pipe apparatus 100 can eliminate any structures, which may force mixing, thereby allowing the flame to be surrounded by a layer of oxygen until the outlet of the discharge block 105.

This design allows all metallic portions of the burner, as well as the discharge block 105 to be protected from the high oxygen fuel flame temperatures. By protecting the discharge block from these high temperatures this invention is able to make the discharge throat narrower while still keeping the burner 104 relatively cool. The design of a discharge throat can contain two angles, which seek to closely match the expansion of the products of combustion as they exit the burner 104.

By implementing this approach, we can ensure that the discharge throat 117 is completely filled with products of combustion and there is no opportunity for furnace atmosphere re-circulation, which can eventually lead to glass buildup and overheating issues. The combination of the burner nozzle and the block design allows for the complete elimination of any glass buildup.

Figure 6:
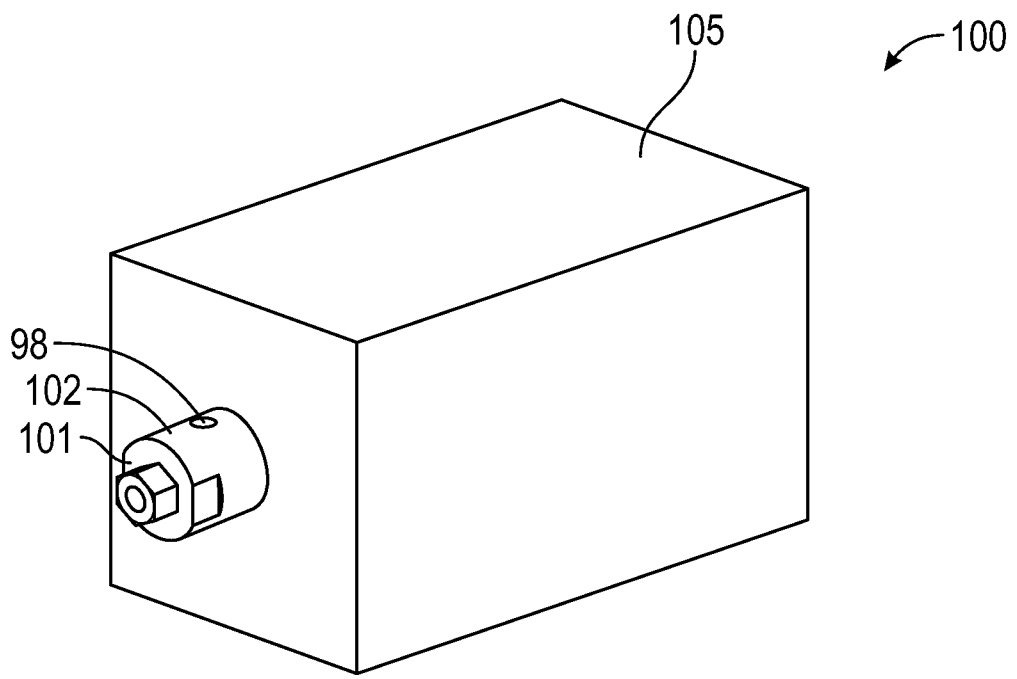
FIG. 6 illustrates a perspective view of the coaxial fuel and oxygen pipe apparatus shown in FIG. 5, in accordance with an embodiment.

FIG. 6 illustrates a perspective view of the coaxial fuel and oxygen pipe apparatus 100 shown in FIG. 5, in accordance with an embodiment. Note that in FIGS. 5-6, identical or similar parts or elements are generally indicated by identical reference numerals. In the diagram depicted in FIG. 6, the discharge block 105 is shown along with the fuel pipe 101 and the oxygen pipe 102.

Figure 7:
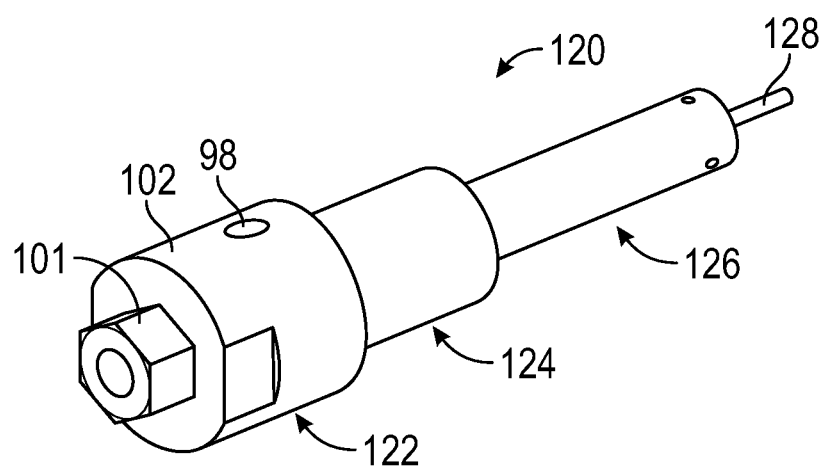
FIG. 7 illustrates a perspective view of the central body of the coaxial fuel and oxygen pipe apparatus shown in FIGS. 5-6, in accordance with an embodiment.

FIG. 7 illustrates a perspective view of the central body 120 of the coaxial fuel and oxygen pipe apparatus 100 shown in FIGS. 5-6, in accordance with an embodiment. The diagram in FIG. 7 depicts the central body 120 without the discharge block 105.

Based on the foregoing, it can be appreciated that the design of the discharge block 105 of the coaxial fuel and oxygen pipe apparatus 100 includes two angles that can create the conditions necessary to eliminate recirculation. These angles can be specifically matched to the expansion rate of the products of combustion to ensure that positive pressure is maintained everywhere throughout the final discharge.

Figure 8:
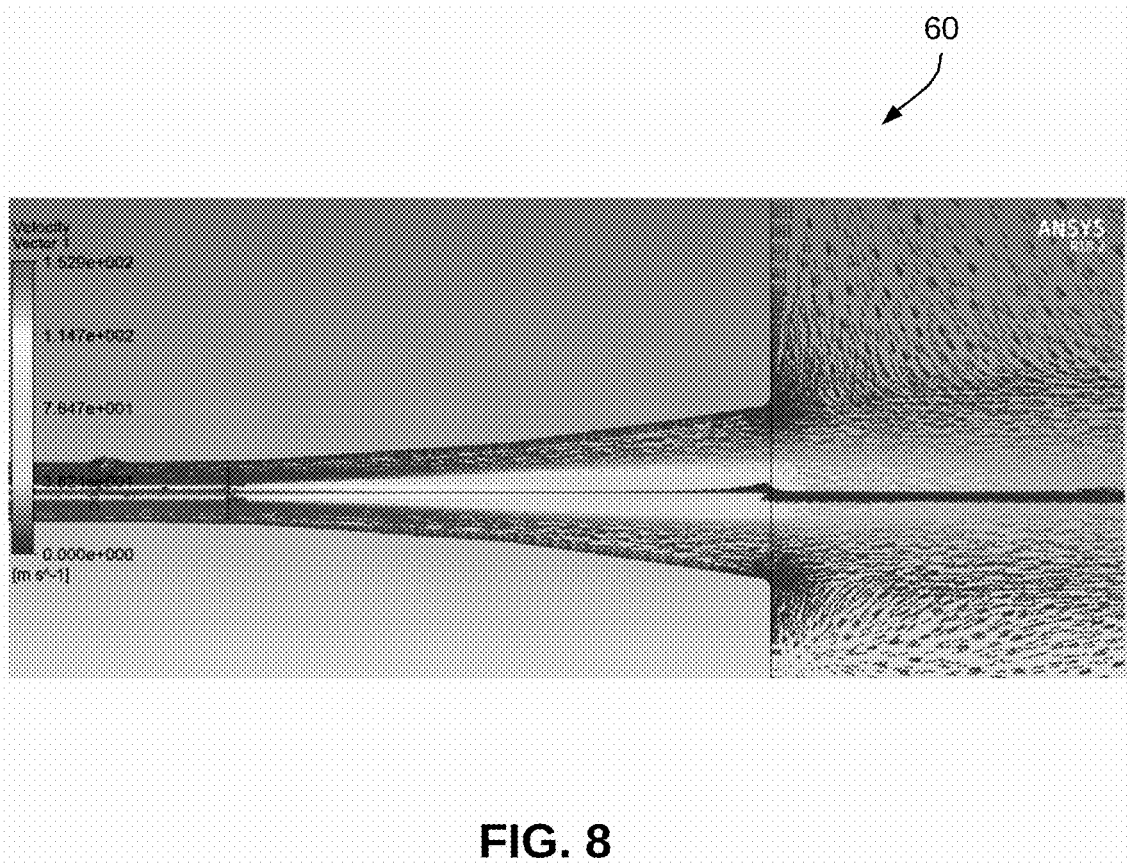
FIG. 8 illustrates CFD results demonstrating that there is no re-circulation of a forehearth atmosphere when using the coaxial fuel and oxygen pipe apparatus 100, in accordance with an embodiment.

FIG. 8 illustrates CFD results 60 demonstrating that there is no re-circulation of a forehearth atmosphere when using the coaxial fuel and oxygen pipe apparatus 100, in accordance with an embodiment.

The coaxial fuel and oxygen pipe apparatus 100 thus can include the fuel pipe 101 and the oxygen pipe 102 wherein the fuel pipe 101 is contained within the oxygen pipe 102 and the oxygen pipe 102 comprises an internal diameter that is continuous without diameter changes along a length of the oxygen pipe 102 and wherein the fuel pipe 101 comprises an internal diameter that is continuous without diameter variations along a length of the fuel pipe 101. The coaxial fuel and oxygen pipe apparatus 100 can further include the discharge block 105, which can be configured with a diverging section and a discharge that forms a final outlet with respect to the fuel pipe 101 and the oxygen pipe 102. The discharge block 105 is configured with two angles that facilitate conditions for eliminating recirculation, wherein the two angles are matched to an expansion rate of the products of combustion to maintain a positive pressure throughout a final discharge from the final outlet.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A coaxial fuel and oxygen pipe apparatus, comprising:
   a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe;
   a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet;
   a burner inserted into the discharge block, wherein oxygen enters the oxygen pipe in a hole through the burner at a right angle to a longitudinal axis of the burner and fuel enters the fuel pipe axially through the burner, wherein the fuel pipe extends beyond the oxygen pipe, the fuel pipe includes a first fuel portion and a second fuel pipe portion, wherein the second fuel pipe portion is thinner and narrower than the first fuel pipe portion; and
   a discharge throat in the discharge block, the discharge including an inlet, wherein the internal diameter of the oxygen pipe matches an internal diameter of the inlet of the discharge throat to allow metallic portions of the discharge throat to be protected from high oxygen fuel flame temperature, and wherein the discharge throat contains the two angles that are matched to the expansion rate of the products of combustion as the products exit the final outlet to ensure that the discharge throat is filled with the products of combustion and to avoid furnace atmosphere re-circulation.

2. The coaxial fuel and oxygen pipe apparatus of claim 1 further comprising a burner that is inserted into the discharge block.

3. The coaxial fuel and oxygen pipe apparatus of claim 1 wherein oxygen enters the oxygen pipe through a burner at a right angle to a longitudinal axis of the burner and fuel enters the fuel pipe axially through the burner.

4. The coaxial fuel and oxygen pipe apparatus of claim 1 further comprising a burner that is inserted into the discharge block, wherein oxygen enters the oxygen pipe through the burner at a right angle to a longitudinal axis of the burner and fuel enters the fuel pipe axially through the burner, wherein the fuel pipe extends beyond the oxygen pipe.

5. The coaxial fuel and oxygen pipe apparatus of claim 1 wherein the fuel pipe is setback from the diverging section of the discharge block.

6. The coaxial fuel and oxygen pipe apparatus of claim 1 wherein the discharge block is operable to accept the fuel pipe.

7. A coaxial fuel and oxygen pipe apparatus, comprising:
   a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe;
   a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet;
   a burner inserted into the discharge block, wherein oxygen enters the oxygen pipe in a hole through the burner at a right angle to a longitudinal axis of the burner and fuel enters the fuel pipe axially through the burner, wherein the fuel pipe extends beyond the oxygen pipe, the fuel pipe includes a first fuel portion and a second fuel pipe portion, wherein the second fuel pipe portion is thinner and narrower than the first fuel pipe portion; and
   a discharge throat in the discharge block, the discharge throat including an inlet, wherein the internal diameter of the oxygen pipe matches an internal diameter of the inlet of the discharge throat to allow metallic portions of the discharge throat to be protected from high oxygen fuel flame temperature, and wherein the discharge throat contains the two angles that are matched to the expansion rate of the products of combustion as the products exit the final outlet to ensure that the discharge throat is filled with the products of combustion and to avoid furnace atmosphere re-circulation.

8. The coaxial fuel and oxygen pipe apparatus of claim 7 wherein oxygen enters the oxygen pipe through the burner at a right angle to a longitudinal axis of the burner and fuel enters the fuel pipe axially through the burner.

9. The coaxial fuel and oxygen pipe apparatus of claim 7 wherein the fuel pipe extends beyond the oxygen pipe.

10. The coaxial fuel and oxygen pipe apparatus of claim 7 wherein the fuel pipe is setback from the diverging section of the discharge block.

11. The coaxial fuel and oxygen pipe apparatus of claim 7 wherein the discharge block is operable to accept the fuel pipe.

12. A forehearth, comprising:
    a coaxial fuel and oxygen pipe apparatus that includes a fuel pipe and an oxygen pipe, wherein the fuel pipe is contained within the oxygen pipe and the oxygen pipe comprises an internal diameter that is continuous without diameter changes along a length of the oxygen pipe and wherein the fuel pipe comprises an internal diameter that is continuous without diameter variations along a length of the fuel pipe;

a discharge block having a diverging section and a discharge that forms a final outlet with respect to the fuel pipe and the oxygen pipe, wherein the discharge block is configured with two angles that facilitate conditions for eliminating recirculation, wherein the two angles are matched to an expansion rate of the products of combustion to maintain a positive pressure throughout a final discharge from the final outlet;

a burner that is inserted into the discharge block, wherein oxygen enters the oxygen pipe through the burner at a right angle to a longitudinal axis of the burner and fuel enters the fuel pipe axially through the burner, wherein the fuel pipe extends beyond the oxygen pipe, wherein the fuel pipe includes a first fuel portion and a second fuel pipe portion, the second fuel pipe portion is thinner and narrower than the first fuel pipe portion; and a discharge throat in the discharge block, the discharge throat including an inlet, wherein the internal diameter of the oxygen pipe matches an internal diameter of the inlet of the discharge throat to allow metallic portions of the discharge throat to be protected from high oxygen fuel flame temperature, and wherein the discharge throat contains the two angles that are matched to the expansion rate of the products of combustion as the products exit the final outlet to ensure that the discharge throat is filled with the products of combustion and to avoid furnace atmosphere re-circulation.

13. The forehearth of claim 12 wherein the fuel pipe is setback from the diverging section of the discharge block.

14. The forehearth of claim 12 wherein the discharge block is operable to accept the fuel pipe.

* * * * *